United States Patent [19]
Niki

[11] Patent Number: 4,458,632
[45] Date of Patent: Jul. 10, 1984

[54] WATER DISPENSER FOR SMALL ANIMALS

[76] Inventor: Motohiro Niki, 22-11, Yushima 2-Chome, Bunkyo-ku, Tokyo-To, Japan

[21] Appl. No.: 452,748

[22] Filed: Dec. 23, 1982

[30] Foreign Application Priority Data

Dec. 26, 1981 [JP] Japan .................. 56-194305[U]

[51] Int. Cl.³ .............................................. A01K 7/06
[52] U.S. Cl. .................... 119/72.5; 137/312
[58] Field of Search ............. 119/18, 72, 72.5, 75; 137/312, 313; 251/298, 303

[56] References Cited
U.S. PATENT DOCUMENTS

| | | | |
|---|---|---|---|
| 1,456,045 | 5/1923 | Wilkin | 137/313 |
| 3,613,642 | 10/1971 | Restall et al. | 119/72.5 X |
| 4,006,716 | 2/1977 | Cross | 119/72.5 |
| 4,258,664 | 3/1981 | Atchley et al. | 119/75 X |
| 4,346,672 | 8/1982 | Niki | 119/72.5 |
| 4,406,253 | 9/1983 | Atchley et al. | 119/75 X |

Primary Examiner—Robert P. Swiatek
Attorney, Agent, or Firm—Ladas & Parry

[57] ABSTRACT

A water dispenser for feeding small animals comprises a support casing supplied with water, a water feed tube supported at its upstream end by the support casing and extending into a cage for the small animals to terminate at the downstream end, a poppet valve provided within the support casing to control water flow into the water feed tube, and a guard tube fixedly supported by the support casing and extending into the cage so as to encompass the water feed tube. The guard tube terminates short of the downstream end of the water feed tube. The free end part of the guard tube supports therebelow a drip trough having a bottom wall sloping downward from the inside of the cage toward the outside of the same, whereby water dripping from the downstream end of the feed tube is caught by the trough and flows to the outside.

3 Claims, 3 Drawing Figures

WATER DISPENSER FOR SMALL ANIMALS

BACKGROUND OF THE INVENTION

This invention relates generally to water dispenser for feeding small animals, and more particularly to an improved type thereof specifically adapted for feeding mice and rats.

Automatic feeding of drinking water to experimental animals is essential for labor-saving breeding of these animals and for providing a supply of drinking water at all times.

Among water dispensers for various small animals such as mice and rats, there is a horizontal type dispenser comprising a fixed support structure provided outside the cage in which mice and rats are bred, a substantially horizontal water feed tube resiliently supported at its proximal or upstream end by the support structure and extending into the cage, and a poppet valve within the structure to control water flow from the water supply source into the feed tube. When a small animal within the cage senses the water vapor from within the feed tube, it nudges the free end of the feed tube. The nudging force thus applied to the feed tube causes it to be inclined so that the poppet valve is opened to cause water to flow into the feed tube and out of the downstream end thereof. Thus, the animal can drink the water.

In this case, however, excess or unused portion of the water thus fed tends to drip downward from the downstream end of the feed tube onto the fed or floor of the cage, thus wetting the same and necessitating bed cleaning and drying. Sometimes small animals in the cage touch the downstream end of the feed tube with their forelegs in fun, causing continuous flow of water into the cage. This is serious because the bed or floor of the cage will be flooded.

SUMMARY OF THE INVENTION

The main object of this invention is to provide a water dispenser for feeding small animals wherein any excess or unused portion of the water fed is prevented from dripping or flowing onto the bed or floor or the cage and flows away automatically to the outside of the cage, thus preventing the bed or floor from becoming wet.

Another object of this invention is to provide a water dispenser of the above stated type which is simple in construction, easy to manufacture and inexpensive and which is reliable in operation.

According to this invention, the water dispenser for feeding small animals being bred in a cage, comprises: a fixed supporting structure provided outside the cage and connected to a water supply source; a substantially horizontal water feed tube having an upstream end through which water flows into the tube and a downstream end which is located within the cage and through which water flows out into the cage, the water feed tube being supported by the supporting structure in such a manner as to be capable of being inclined by a nudging force applied by a small animal to the downstream end of the tube; valve means provided in the supporting structure and interposed between the upstream end of the feed tube and the water supply source, the valve means closing normally to prevent water from flowing into the feed tube and having means to open it in response to inclination of the feed tube caused by a small animal; a guard tube secured at its proximal end to the supporting structure and extending into the cage so as to surround the feed tube, the free end of said guard tube terminating short of the downstream end of the feed tube; and a drip trough disposed below and along, and secured to the free end portion of the guard tube and having one end thereof projecting beyond the downstream end of the feed tube and the other end thereof disposed outside the cage, the drip trough having a bottom wall sloping downward from the one end toward the other end, whereby water dripping downward from the downstream end of the feed tube is caught by the drip trough and flows outward along the bottom wall.

The nature, principle, and utility of this invention will be more clearly apparent from the following detailed description of the invention when read in conjunction with the accompanying drawings.

DETAILED DESCRIPTION OF THE INVENTION

Figure 1:
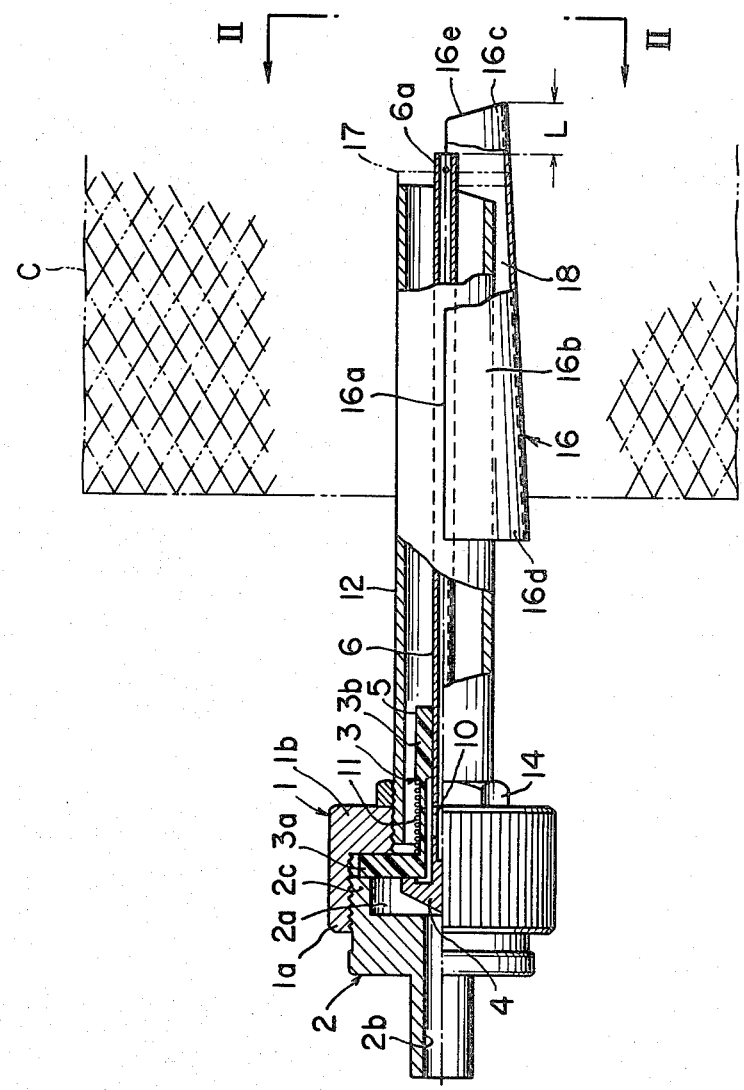
FIG. 1 is a side elevation in longitudinal section showing one example of a water dispenser according to this invention.

Referring to FIG. 1 of the accompanying drawing, the water dispenser is in a substantially horizontal state with its upstream end disposed outside (to the left as viewed in FIG. 1) of a cage C or pen housing one or more small animals such as mice or rats and with its downstream water-dispensing end disposed inside the cage C.

This water dispenser has a casing (or a supporting member) 1 of the shape of a cylindrical cup or screw socket comprising a cylindrical wall part 1a with a tapped inner surface and an end wall part 1b with a central tapped hole. A nipple-like screw fitting 2 has a recessed cavity 2a at its inner end and a central through hole 2b communicating with the cavity 2a, and the open inner end 2c of the fitting 2 is screwed into the cylindrical wall part 1a of the casing 1. The central through hole 2b is connected to a water supply source not shown. When this screw fitting 2 is thus fully screwed into the casing 1, its inner end abuts against a flange part 3a of an elastic valve seat member 3 which is in contact on its opposite side with the above mentioned end wall part 1b of the casing 1. The flange part 3a of the valve seat member 3 is thereby clamped firmly between the screw fitting 2 and the casing 1.

Figure 3:
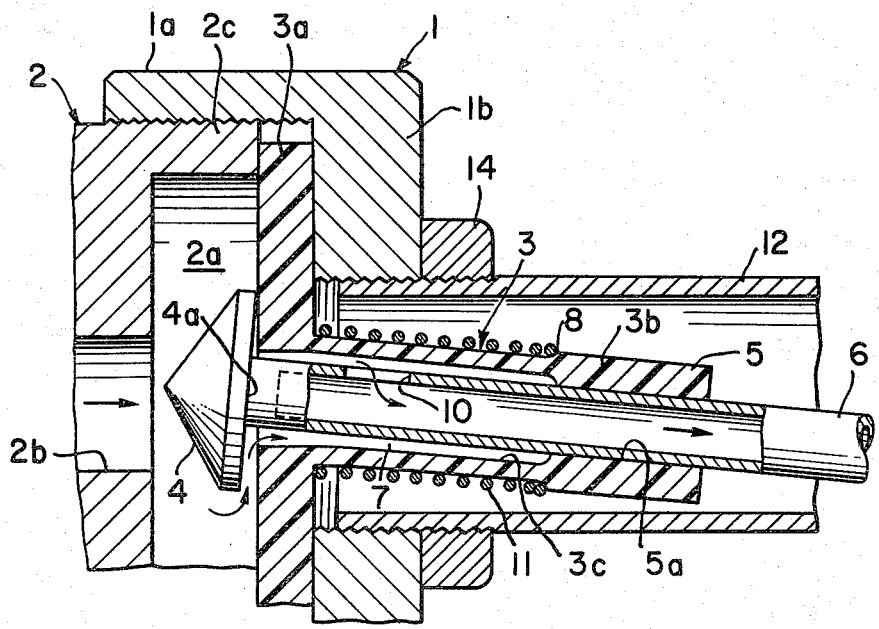
FIG. 3 is a fragmentary longitudinal section, on an enlarged scale, of the water dispenser, showing a valve and related parts in a deflected state due to movement of the downstream end of a feed tube, in which state the valve is partly opened.

The elastic valve seat member 3 has a hollow cylindrical portion 3b formed coaxially and integrally with the flange part 3a and extending downstream therefrom. As shown in FIG. 3, this cylindrical portion 3b has a central bore 3c which extends upstream through the flange part 3a and is communicable with the above mentioned cavity 2a depending on the seating state of a poppet or lift valve 4 relative to the flange part 3a of the valve seat member 3. The cylindrical portion 3a has its downstream end an end wall part 5 having a central bore 5a of an inner diameter less than the inner diameter of the central bore 3c of the cylindrical portion 3b.

The above mentioned poppet valve 4 is of conical shape and is coaxially fixed at its base part 4a to the upstream end of a water feed tube 6, the outer diameter of which is less than the diameter of the base part 4a of the valve 4. The annular base part 4a of the valve 4 thus left is the valve surface for seating against the planar surface of the flange part 3a of the valve seat member 3. In assembled state, the feed tube 6 extends through the central bores 3c and 5a of the cylindrical portion 3b and the end wall part 5 of the elastic valve seat member 3. The outer diameter of the feed tube 6 is also less than the inner diameter of the central bore 3c of the cylindrical portion 3b, whereby an annular or cylindrical space 7 is formed between the feed tube 6 and the cylindrical portion 3b.

The inner diameter of the central bore 5a of the end wall part 5, however, is made to be less than the outer diameter of the feed tube 6 in the initial, free state of the elastic valve seat member 3 prior to assembly. This difference in diameters will not only provide a watertight fit between the surface of the bore 5a and the tube 6 but also tend to enlarge the outer diameter of the end wall part 5 to a value somewhat greater than the cylindrical portion 3 at its upstream part, whereby an annular shoulder 8 will be formed around the outer surface at the junction between the cylindrical portion 3b and the end wall part 5.

In the assembling of the feed tube 6 relative to the elastic valve seat member 3, the feed tube 6 is inserted, with its downstream end in leading position, into and through the open upstream end of the central bore 3c, through the interior of the bore 3c, and forcibly through the bore 5a. In the final assembled state, the cylindrical portion 3b and, to a lesser degree, the end wall part 5 are caused to be in a longitudinally compressed state, which is maintained by the firm frictional contact between the wall of the central bore 5a and the outer surface of the feed tube 6 and by the abutting contact between the base of the valve 4 and the valve seat 3. Accordingly, an elastic force in the downstream direction is exerted on the feed tube 6, tending to maintain the base of the valve 4 flush against the flange part 3a of the valve seat 3, whereby the valve 4 is in its normally closed state shown in FIG. 1.

The feed tube 6 is provided at a part thereof to be positioned within the central bore 3c with a through hole 10 formed through its wall to permit water in the above mentioned cylindrical space 7 between the feed pipe 6 and the cylindrical portion 3b to flow into the interior of the feed tube 6 when the valve 4 is opened as shown in FIG. 3. When the valve 4 is subsequently closed, the flow of water stops, but some water is always retained in the cylindrical space 7 and can be sensed by a small animal near the downstream end of the feed tube 6.

At least the cylindrical portion 3b of the elastic valve seat member 3, exclusive of the end wall part 5, is encompassed by a coil spring 11 which, in its assembled state, extends from the inner surface of the flange portion 3a of the member 3 to the shoulder 8. When the coil spring 11 is fitted on the cylindrical portion 3b in assembled state, it is in a compressed state, which is maintained by its abutment at its outer end against the inner surface of the flange part 3a and by its abutment against the shoulder 8. The coil spring 11 functions to reinforcingly hold the cylindrical portion 3b to deter cracking or tearing thereof in the event that cracks or tears should develop.

In the water dispenser of the above described construction, the elastic valve seat member 3 is made of a heat-resistant and water-resistant material having the required elasticity such as a synthetic rubber, preferably a silicone rubber. All other parts are preferably made of 18-8 stainless steel so that they can withstand repeated sterilization with steam and resist corrosion.

The outer threaded end of a guard tube 12 is screwed into the above mentioned central tapped hole of the end wall part 1b of the casing 1. A nut 14 is also screw engaged with the threaded end of the guard tube 12 to lock the screw engagement between guard tube 12 and the casing 1. The guard tube 12 terminates short of the downstream end 6a of the feed tube 6 so as to expose the end 6a of the tube 6 to enable nudging action thereon by a small animal.

Figure 2:
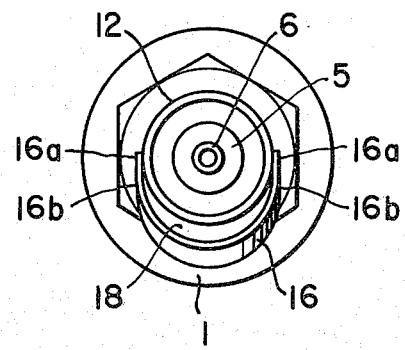
FIG. 2 is an enlarged end view of the water dispenser, as viewed in the direction of arrows II in FIG. 1.

A drip trough 16 is fixed to the free or downstream end of the guard tube 12 as shown in FIGS. 1 and 2. The drip trough 16 is of a U-shaped cross section with an arcuate bottom and opposite upstanding sides 16b and extends along the lower half of the downstream end portion of the guard tube 12. The drip trough 16 is fixed to the side surfaces of the guard tube 12, as by brazing, at the upper edges 16a of the two upstanding sides 16b thereof. A support member 17 may additionally be provided on the downstream extremity of the guard tube 12 as shown.

It is to be noted that the bottom wall of the drip trough 16 is in downwardly spaced apart relationship to the lower surface of the guard tube 12 so that a space 18 is formed between the drip trough 16 and the guard tube 12. The bottom wall of the drip trough 16 slopes downwardly from its end 16c remote from the casing 1 toward the other end 16d nearer to the casing 1. It is further to be noted that the end 16c of the drip trough 16 projects beyond the downstream end 6a of the feed tube 6 by a distance L, which is normally between about 1 millimeter and about 5 millimeters. The greater part of the drip trough 16 is disposed within the cage C, but the end part 16d thereof must be disposed outside the cage C. The end surface 16e of the drip trough 16 is so cut obliquely that the bottom wall of the trough projects farther beyond the end 6a of the tube 6 than the upper edges 16a thereof. This facilitates water drinking by the small animals while preventing water spilling from the trough 16.

When the inner or downstream end of the water feed tube 6 is touched by a small animal such as a mouse or a rat, the water feed tube 6 is thereby angularly displaced as shown in FIG. 3 against the resilient force of the elastic valve seat member 3. The base of the poppet valve 4 at the outer or upstream end of the water feed tube 6 is thereby inclined relative to the planar valve seat surface of the valve seat member 3, thus forming a narrow gap on one side thereof between the base surface of the valve and the valve seat surface of the valve seat member 3. Water in the chamber 2a is thus passed through the narrow gap into the cylindrical space 7 formed within the cylindrical portion 3b of the valve seat member 3. The water is then passed through the hole 10 to the interior of the water feed tube 6, and thereafter toward the inner end 6a of the feed tube 6.

Since the end wall part 5 of the cylindrical portion 3b of the valve seat member 3 engages the circumferential wall of the feed tube 6 in a water-tight manner, leakage of water through this part is completely prevented. The sizes of the poppet valve 14, hole 10, and the inner diameter of the water feed tube 6 are so selected that the flow rate of the water flowing through the water feed tube 6 at the time when the downstream end thereof is touched by a mouse or rat becomes suitable for normal drinking of the water by the mouse or rat.

When the animal ceases to nudge the downstream end 6a of the water feed tube 6, the poppet valve instantaneously stops the water flow. In this case, however, the water filling the interior of the water feed tube 6 or at least the cylindrical space 7 is retained even after the closure of the valve. A mouse or rat that desires to drink water senses the water vapor coming from the end 6a of the water feed tube 6 and nudges the end as described above.

The guard tube 12 protects the feed tube 6 from mechanical damage, and limits lateral movements of the water feed tube 6.

Any excess or unused portion of the water thus fed drips downward from the end 6a of the feed tube 6 into the drip trough 16 at its extreme end part 16c. The water thus caught by the drip trough 16 and prevented from dripping onto the bed or floor of the cage C flows outward along the bottom wall of the trough 16, because of the inclination of the trough, and flows out of the trough at the end part 16d outside the cage.

Sometimes, small animals in a playful mood touch the end 16e of the feed tube in fun with their forelegs. This causes continuous flow of water out of the feed tube. The drip trough 16 catches any of such water and makes it flow to the outside. Since the drip trough 16 is a member of simple construction, it can be manufactured easily and can be attached to the guard tube of an existing water dispenser.

What is claimed is:

1. A water dispenser for feeding small animals being bred in a cage, comprising: a fixed supporting structure provided outside the cage and connected to a water supply source; a substantially horizontal water feed tube having an upstream end through which water flows into the tube and a downstream end which is located within the cage and through which water flows out into the cage, said water feed tube being supported by said supporting structure in such a manner as to be capable of being inclined by a nudging force applied by a small animal to the downstream end of the tube; valve means provided in the supporting structure and interposed between the upstream end of the feed tube and the water supply source, said valve means closing normally to prevent water from flowing into the feed tube and having means to open it in response to inclination of the feed tube caused by a small animal; a guard tube secured at its proximal end to said supporting structure and extending into the cage so as to surround the feed tube, the free end of said guard tube terminating short of the downstream end of the feed tube; and a drip trough disposed below and along, and secured to the free end portion of the guard tube and having one end thereof projecting beyond the downstream end of the feed tube and the other end thereof disposed outside the cage, said drip trough having a bottom wall sloping downward from said one end toward said other end, whereby water dripping downward from the downstream end of the feed tube is caught by the drip trough and flows outward along the bottom wall.

2. A water dispenser for feeding small animals as claimed in claim 1, wherein said drip trough is of a U-shaped cross section with an arcuate bottom and opposite upstanding sides which are secured at their upper edges to the side surfaces of the guard tube.

3. A water dispenser for feeding small animals as claimed in claim 2, wherein said one end of the drip trough is so cut obliquely that the bottom wall of the trough projects farther beyond the downstream end of the feed tube than the upper edges of the upstanding side walls of the trough.

* * * * *